United States Patent
Bollinger, Jr. et al.

(10) Patent No.: US 10,535,996 B2
(45) Date of Patent: Jan. 14, 2020

(54) CONTROLLABLE ELECTRICAL OUTLET HAVING A RESONANT LOOP ANTENNA

(71) Applicant: Lutron Technology Company LLC, Coopersburg, PA (US)

(72) Inventors: Robert Bollinger, Jr., Fogelsville, PA (US); Dragan Veskovic, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 64 days.

(21) Appl. No.: 15/496,659

(22) Filed: Apr. 25, 2017

(65) Prior Publication Data

US 2017/0310109 A1 Oct. 26, 2017

Related U.S. Application Data

(60) Provisional application No. 62/327,163, filed on Apr. 25, 2016.

(51) Int. Cl.

| | |
|---|---|
| *H02J 1/00* | (2006.01) |
| *H02J 3/00* | (2006.01) |
| *H02J 3/14* | (2006.01) |
| *H01R 13/11* | (2006.01) |
| *H01R 13/66* | (2006.01) |
| *H02J 13/00* | (2006.01) |
| *H04B 1/16* | (2006.01) |
| *H01Q 1/22* | (2006.01) |
| *H01Q 1/38* | (2006.01) |
| *H01Q 7/00* | (2006.01) |
| *H01Q 1/52* | (2006.01) |

(52) U.S. Cl.
CPC .................. *H02J 3/14* (2013.01); *H01Q 1/22* (2013.01); *H01Q 1/38* (2013.01); *H01Q 7/005* (2013.01);

(Continued)

(58) Field of Classification Search
CPC ....... H01R 13/11; H01R 13/6675; H02J 3/14; H02J 13/0075; H01Q 7/005; H01Q 1/22; H01Q 1/38; H01Q 1/52; H04B 1/16
See application file for complete search history.

(56) References Cited

U.S. PATENT DOCUMENTS 6,380,696 B1 * 4/2002 Sembhi ............... H05B 37/029
315/294
6,708,877 B2 * 3/2004 Blankenship ........ B23K 9/1062
235/375

(Continued)

FOREIGN PATENT DOCUMENTS

WO 2012158525 A1 11/2012

*Primary Examiner* — Alfonso Perez Borroto
*Assistant Examiner* — Esayas G Yeshaw
(74) *Attorney, Agent, or Firm* — Philip N. Smith; Glen R. Farbanish; Amy E. Yanek

(57) ABSTRACT

A controllable electrical outlet may comprise a resonant loop antenna. The resonant loop antenna may comprise a feed loop electrically coupled to a radio-frequency (RF) communication circuit and a main loop magnetically coupled to the feed loop. The controllable electrical outlet may comprise one or more electrical receptacles configured to receive a plug of a plug-in electrical load and may be configured to control power delivered to the plug-in electrical load in response to an RF signal received via the RF communication circuit. The RF performance of the controllable electrical outlet may be substantially immune to devices plugged into the receptacles (e.g., plugs, power supplies, etc.) due to the operation of the resonant loop antenna. For example, degradation of the RF performance of the controllable electrical outlet may be less when the controllable electrical outlet includes the resonant loop antenna rather than other types of antennas.

20 Claims, 6 Drawing Sheets

(52) U.S. Cl.
CPC ......... *H01R 13/11* (2013.01); *H01R 13/6675* (2013.01); *H02J 13/0075* (2013.01); *H04B 1/16* (2013.01); *H01Q 1/52* (2013.01)

(56) References Cited

U.S. PATENT DOCUMENTS

| | | | |
|---|---|---|---|
| 7,000,837 B2 * | 2/2006 | Akiho | G06K 7/0008 |
| | | | 235/451 |
| 7,362,285 B2 | 4/2008 | Webb et al. | |
| 7,592,967 B2 | 9/2009 | Mosebrook et al. | |
| 7,756,556 B2 | 7/2010 | Patel et al. | |
| 7,834,817 B2 | 11/2010 | Mosebrook et al. | |
| 7,938,676 B1 | 5/2011 | Patel et al. | |
| 8,105,094 B2 | 1/2012 | Patel et al. | |
| 8,417,388 B2 | 4/2013 | Kltonen et al. | |
| 8,823,268 B2 | 9/2014 | Saveri, III et al. | |
| 9,167,669 B2 | 10/2015 | Karc et al. | |
| 2005/0280598 A1 | 12/2005 | Webb et al. | |
| 2006/0273970 A1 | 12/2006 | Mosebrook et al. | |
| 2011/0104919 A1 | 5/2011 | Patel et al. | |
| 2014/0132084 A1 | 5/2014 | Pham et al. | |
| 2015/0249337 A1 | 9/2015 | Raneri et al. | |
| 2016/0338625 A1 * | 11/2016 | Min | A61B 5/1473 |
| 2017/0085070 A1 | 3/2017 | AbuGazaleh | |

* cited by examiner

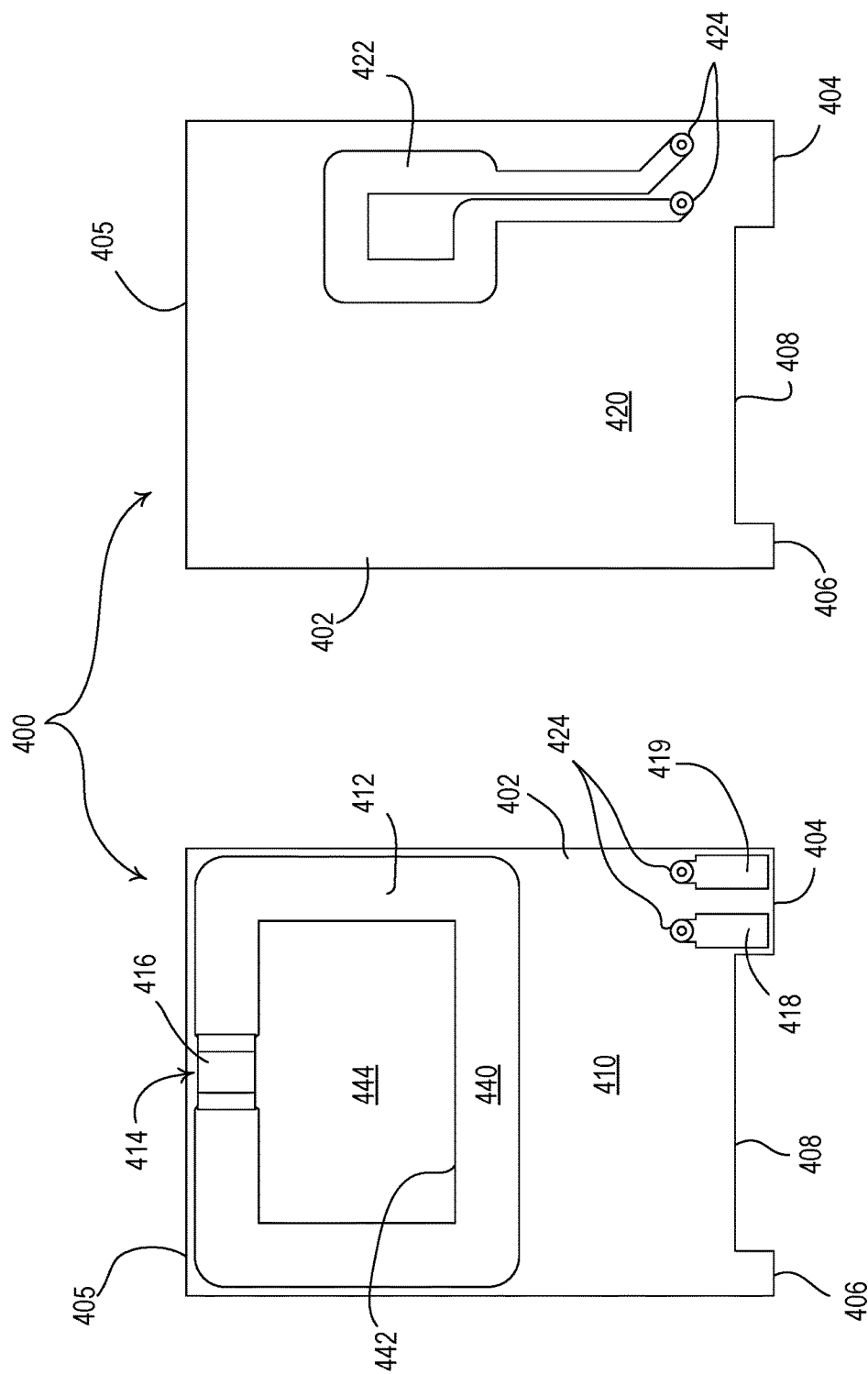

CONTROLLABLE ELECTRICAL OUTLET HAVING A RESONANT LOOP ANTENNA

CROSS REFERENCE TO RELATED APPLICATIONS

This application claims the benefit of U.S. Provisional Patent Application No. 62/327,163, filed Apr. 25, 2016, entitled CONTROLLABLE ELECTRICAL OUTLET HAVING A RESONANT LOOP ANTENNA, the entire disclosure of which is incorporated by reference herein.

BACKGROUND

Many consumers reduce the total cost of electrical energy by reducing the total energy usages of electrical loads, such as lighting loads. For example, lighting loads are often controlled in response to occupancy and vacancy sensors, which detect occupancy and/or vacancy conditions in a space, to save energy. Typically, the lighting loads are turned on when the space is occupied and turned off when the space is unoccupied. In addition, consumers are becoming more sensitive to the amount of energy consumed by electrical loads, such as plug-in electrical loads that are plugged into electrical receptacles. Such plug-in electrical loads may still consume energy to maintain a standby mode when "turned off" and are often referred to as "vampire" loads.

Some standards (such as ASHRAE 90.1 and California Title 24) are now requiring that many electrical outlets installed in new construction or major renovations must be controlled (e.g., switched) to provide energy savings. For example, the electrical outlets may be controlled in response to a timeclock and/or an occupancy or vacancy sensor. Such electrical outlets may be coupled to a communication link (e.g., a wired or wireless digital communication link) and may be configured to receive digital messages including commands for controlling the plug-in electrical loads (e.g., in response to the timeclock and/or the occupancy or vacancy sensor).

SUMMARY

As described herein, a controllable electrical outlet for use in a load control system adapted to receive power from a power source may comprise a resonant loop antenna for receiving a radio-frequency (RF) signal. The resonant loop antenna may comprise a feed loop electrically coupled to an RF communication circuit and a main loop magnetically coupled to the feed loop. The controllable electrical outlet may comprise one or more electrical receptacles configured to receive a plug of a plug-in electrical load and an electrical connection configured to be electrically coupled to the power source to receive a hot voltage. The controllable electrical outlet may also comprise a load control circuit electrically coupled in series between the electrical connection and the electrical receptacle to control power delivered to the plug-in electrical load, and a control circuit coupled to the load control circuit and the communication circuit to control power delivered to the plug-in electrical load in response to an RF signal received via the RF communication circuit. The RF performance of the controllable electrical outlet may be substantially immune to devices plugged into the receptacles (e.g., plugs, power supplies, control devices, etc.) due to the operation of the resonant loop antenna. For example, degradation of the RF performance of the controllable electrical outlet may be less when the controllable electrical outlet includes the resonant loop antenna rather than other types of antennas, such as a monopole antenna.

In addition, the controllable electrical outlet may comprise a main printed circuit board on which the load control circuit is mounted. The resonant loop antenna may comprise an antenna printed circuit board comprising first and second layers and arranged perpendicular to the main printed circuit board. The first layer may have a main loop trace characterized by an inductance and a capacitance that are resonant at the specified frequency. The second layer may have a feed loop trace electrically coupled to the RF communication circuit and magnetically coupled to the main loop trace.

Further, an electrical contact of one of the receptacles may be coupled to an electrical contact of the other receptacle by an electrical contact coupling member. The main loop trace of the antenna printed circuit board may be mostly located above the coupling member in a direction extending from the main printed circuit boards towards a front surface of the electrical outlet. A top edge of a lower portion of the main loop trace of the antenna printed circuit board may be positioned above the coupling member in a direction extending from the main printed circuit boards towards a front surface of the electrical outlet. An inner portion of the main loop trace of the antenna printed circuit board may not overlap with the coupling member when viewed from the side.

BRIEF DESCRIPTION OF THE DRAWINGS

FIGS. 7 and 8 show first and second layers of an antenna printed circuit board.

DETAILED DESCRIPTION

Figure 1:
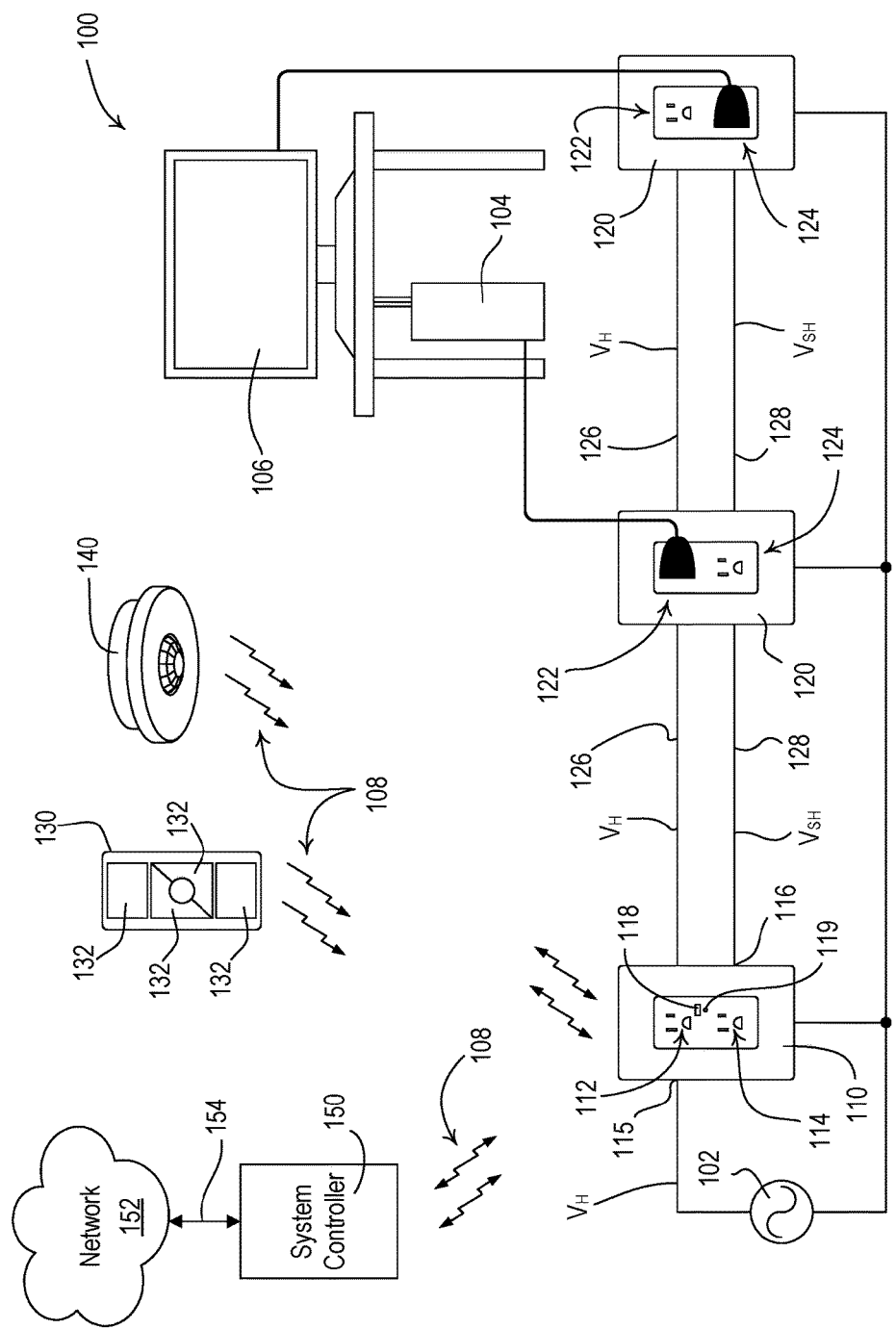
FIG. 1 is a simple diagram of an example load control system having a controllable electrical outlet.

FIG. 1 is a simple diagram of an example load control system 100 having a load control device (e.g., a controllable electrical outlet 110), a plurality of standard electrical outlets 120, and a plurality of plug-in electrical loads (e.g., a computer 104 and a monitor 106). The controllable electrical outlet 110 may be adapted to be installed in a standard electrical wallbox (not shown). The controllable electrical outlet 110 may be adapted to be connected to a power source, such as an alternating-current (AC) power source 102 for receiving a hot voltage $V_H$ (e.g., an AC mains line voltage, such as 120 V at 60 Hz or 230 V at 50 Hz) at a line voltage input 115 (e.g., a hot terminal). The controllable electrical outlet 110 may also be connected to the neutral side of the AC power source 102. Alternatively or additionally, the controllable electrical outlet 110 may be configured to receive power from a direct-current (DC) power source.

The controllable electrical outlet 110 may comprise upper and lower receptacles 112, 114 into which the plug of a plug-in electrical load may be plugged. Each receptacle 112, 114 may have a hot connection and a neutral connection for receipt of the corresponding prongs of an electrical plug. The controllable electrical outlet 110 may provide the hot voltage $V_H$ at the upper receptacle 112, such that any electrical loads plugged into the upper receptacle are continuously powered. The controllable electrical outlet 110 may comprise an internal load control circuit (not shown), e.g., a relay for generating a switched-hot voltage $V_{SH}$, which may be provided at the lower receptacle 114. Accordingly, any electrical loads plugged into the lower receptacle 114 may be powered and unpowered in response to closing and opening the relay, respectively. Alternatively, the upper and lower receptacles 112, 114 could both provide the hot voltage $V_H$ or both could provide the switched-hot voltage $V_{SH}$, or the controllable electrical outlet 110 may provide the hot voltage $V_H$ at the lower receptacle 114 and the switched-hot voltage $V_{SH}$ at the upper receptacle 112.

The controllable electrical outlet 110 may also comprise a controlled wired output 116 (e.g., a switched-hot terminal) for providing the switched voltage $V_{SH}$ to the standard electrical outlets 120. The standard electrical outlets 120 may each be configured to receive both the hot voltage $V_H$ and the switched-hot voltage $V_{SH}$. For example, the standard electrical outlets 120 may receive the hot voltage $V_H$ via an electrical wire 126 connected to the line voltage input 115 of the controllable electrical outlet 110. The standard electrical outlets 120 may receive the switched-hot voltage $V_{SH}$ via an electrical wire 128 connected to the controlled wired output 116 of the controllable electrical outlet 110. One or more of the standard electrical outlets 120 may also be connected to the neutral side of the AC power source 102. The controllable electrical outlet 110 may "pass through" the hot voltage $V_H$ to provide the hot voltage $V_H$ from the AC power source 102 to the electrical wire 126 (e.g., directly). Alternatively, the electrical wire 126 may be wired to the hot side of the AC power source 102 around the controllable electrical outlet 110, such that the hot voltage $V_H$ does not pass through the controllable electrical outlet 110 on its way to the standard electrical outlet 120.

Each of the standard electrical outlets 120 may comprise upper and lower receptacles 122, 124 into which an electrical load may be plugged. The upper receptacle 122 of a standard electrical outlet 120 may be electrically coupled to the electrical wire 126 for receiving the hot voltage $V_H$, such that any electrical loads plugged into the upper receptacles are continuously powered. The lower receptacle 124 of a standard electrical outlet 120 may be electrically coupled to the electrical wire 128 for receiving the switched-hot voltage $V_{SH}$, such that any electrical loads plugged into the lower receptacle may be powered and unpowered in response to the closing and opening, respectively, of the relay of the controllable electrical outlet 110. Referring to the example of FIG. 1, the computer 104 may be adapted to be plugged into the upper receptacle 122 of one of the standard electrical outlets 120 (e.g., such that the computer 104 may be continuously powered), while the monitor 106 may be adapted to be plugged into the lower receptacle 124 of one of the standard electrical outlets (e.g., such that the monitor 106 may be turned on and off by the controllable electrical outlet 110. Alternatively, the upper and lower receptacles 122, 124 of a standard electrical outlet 120 could both be coupled to the hot voltage $V_H$ or could both be coupled to the switched-hot voltage $V_{SH}$.

The controllable electrical outlet 110 may be configured to measure the magnitude of the total load current conducted by one or more of the plug-in electrical loads plugged into the controllable electrical outlet 110 and/or the standard electrical outlets 120. For example, the controllable electrical outlet 110 may be configured to measure the magnitude of a first load current conducted by the switched electrical loads (e.g., the electrical loads connected to the lower receptacle 124), and the magnitude of a second load current conducted by the unswitched electrical loads (e.g., the electrical loads connected to the upper receptacle 122).

The controllable electrical outlet 110 may be configured to control the relay to turn the electrical loads plugged into the lower receptacles 114, 124 and/or the standard electrical outlets 120 on and off in response to wireless signals, e.g., radio-frequency (RF) signals 108, received from one or more input devices (e.g., RF transmitters). For example, the input devices may comprise a remote control device 130, an occupancy sensor 140, and/or a system controller 150 (e.g., a central controller or gateway device). As such, the controllable electrical outlet 110 may be controlled automatically (e.g., via an occupancy sensor 140) or manually (e.g., via a remote control device 130). Because the controllable electrical outlet 110 has the controlled wired output 116 for controlling the standard electrical outlets 120, the standard electrical outlets do not need to be responsive to the RF signals 106 in order to switch the respective plug-in electrical loads on and off, thus greatly reducing the cost of the load control system 100.

The remote control device 130 may comprise a battery-powered handheld remote control, or could alternatively be mounted to a wall or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, the entire disclosures of which are hereby incorporated by reference.

The remote control device 130 may transmit digital messages to the controllable electrical outlet 110 via the RF signals 108 in response to actuations of one or more buttons 132 for turning the electrical loads plugged into the lower receptacles 114, 124 on and off. The remote control device 130 may be associated with the controllable electrical outlet 110 by actuating one or more of the buttons 132 of the remote control device and an actuator (e.g., programming button 118) of the controllable electrical outlet 110. The controllable electrical outlet 110 may also comprise a visual indicator 119, e.g., a light-emitting diode (LED), which may be illuminated to provide feedback to a user during configuration and/or normal operation. Since the controllable electrical outlet 110 may be adapted to be installed in a standard electrical wallbox and the programming button 118 may be located on the controllable electrical outlet 110, the programming button 118 may be easily accessed to associate the controllable electrical outlet 110 with the remote control device 130. In addition, the controllable electrical outlet 110 may be installed in the same room in which the remote control device 130 is located to enhance the reliability of the RF communications. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM; U.S. Pat. No. 9,368,025, issued Jun. 14, 2016, entitled TWO-PART LOAD CONTROL SYSTEM MOUNTABLE TO A SINGLE ELECTRICAL WALLBOX; and U.S. Patent Application Publication No. 2014/0265568, published Sep.

18, 2014, entitled COMMISSIONING LOAD CONTROL SYSTEMS; the entire disclosures of which are hereby incorporated by reference.

The occupancy sensor 140 may be configured to detect occupancy and vacancy conditions in the space in which the load control system 100 is installed. The occupancy sensor 140 may transmit digital messages to the controllable electrical outlet 110 via the RF signals 108 in response to detecting the occupancy or vacancy conditions. The controllable electrical outlet 110 may be configured to turn the electrical loads plugged into the lower receptacles 114, 124 on in response to an occupancy condition and off in response to a vacancy condition. The occupancy sensor 140 may be associated with the controllable electrical outlet 110 by actuating a button on the occupancy sensor and/or an actuator (e.g., the programming button 118) of the controllable electrical outlet 110. Since the controllable electrical outlet 110 may be located in the same room as the occupancy sensor 140, the occupancy sensor 140 may be easily associated with the controllable electrical outlet 110 and reliable RF communications may be provided. Alternatively, the occupancy sensor 140 may operate as a vacancy sensor to only turn off the lighting loads in response to detecting a vacancy condition (e.g., to not turn on the lighting loads in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The system controller 150 may be configured to communicate with a network 152 (e.g., a wireless or wired local area network) via a wired digital communication link 154 (e.g., an Ethernet communication link) for access to the Internet. Alternatively or additionally, the system controller 150 may be wirelessly connected to the network 152, e.g., using LTE or Wi-Fi technology. For example, the system controller 150 may be configured to receive digital messages (e.g., Internet Protocol packets) via the network 152 from a network device (not shown), such as a smart phone (e.g., an iPhone® smart phone, an Android® smart phone, or a Blackberry® smart phone), a personal computer, a laptop, a wireless-capable media device (e.g., MP3 player, gaming device, or television), a tablet device, (e.g., an iPad® handheld computing device), a Wi-Fi or wireless-communication-capable television, or any other suitable Internet-Protocol-enabled device. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 150 may operate as a central controller for the load control system 100. The system controller 150 may operate as a gateway device to simply relay digital messages between the network 152 and the controllable electrical outlet 110. The system controller 150 may be configured to transmit digital messages via the RF signals 108 to the controllable electrical outlet 110 for turning on and off the electrical loads plugged into the controllable electrical outlet 110 and/or the standard electrical outlets 120. Accordingly, the controllable electrical outlet 110 may be responsive to data received by the system controller 150 from the Internet, such as weather information and emergency status information. The system controller 150 may be further configured to transmit digital messages including one or more of: a timeclock command, a load shed command, a demand response command, a peak demand command, or time-of-day pricing information. The system controller 150 may be configured to control the controllable electrical outlet 110 in accordance with one or more timeclock events of a timeclock schedule, for example, to turn on the switched electrical loads during the day and to turn off the switched electrical loads at night. In addition, the controllable electrical outlet 110 may be configured to transmit feedback information, such as the status and energy consumption of the controlled loads (e.g., load current), back to the system controller 150, which may be configured to report the information to an external device via the network 152.

The controllable electrical outlet 110 may be configured to store information regarding the type of input device from which the controllable electrical outlet 100 received the digital message. The controllable electrical outlet 110 may be configured to store information regarding how the controllable electrical outlet 110 controlled the electrical loads in response to receiving the digital message. For example, this may be performed by the controller electrical outlet 110 after controlling the electrical loads plugged into the controllable electrical outlet 110 and/or the standard electrical outlets 120 in response to digital messages received via the RF signals 108. The controllable electrical outlet 110 may transmit this information to the system controller 150. The system controller 150 may analyze this information to determine how much energy is saved in response to certain types of input devices. For example, the system controller 150 may be configured to determine how much energy is saved as a result of the controllable electrical outlet 110 turning off the electrical loads plugged into the controllable electrical outlet 110 and/or the standard electrical outlets 120 in response to the occupancy sensor 140 versus how much energy is saved as a result of the controllable electrical outlet turning off the electrical loads in response to the remote control device 130.

The controllable electrical outlet 110 may be configured to determine a balance between the amount of power consumed by the switched and unswitched electrical loads and report this information to the system controller 150. The system controller 150 may be configured to transmit (e.g., to a network device via the network 152) a digital message including an alert that the amount of power consumed by the switched and unswitched electrical loads is unbalanced, for example, if the unswitched electrical loads are consuming a much greater amount of power than the switched electrical loads. For example, the alert may be included in an email or text message sent to a building manager.

Some plug-in electrical loads may still consume energy to maintain a standby mode when off. These electrical loads may be referred to as "vampire" loads. In addition, some plug-in power supplies may still consume energy even when the power supply is not charging a rechargeable load. The controllable electrical outlet 110 may be configured to detect whether one or more of the plug-in electrical loads plugged into the controllable electrical outlet 110 and/or the standard electrical outlets 120 are off, are in the standby mode, and/or are not charging a rechargeable load. The controllable electrical outlet 110 may be configured to determine that a plug-in electrical load is off, is in standby mode, and/or is not charging a rechargeable load if the magnitude of the load current conducted by the plug-in electrical load is less than a predetermined current threshold. For example, the controllable electrical outlet 110 may be configured to remove power from the plug-in electrical load if the controllable electrical outlet has received a digital message indicating a vacancy condition from the occupancy sensor 140 and has determined that the plug-in electrical load is off, is in the standby mode, and/or is not charging a rechargeable load. The controllable electrical outlet 110 will not remove power from the plug-in electrical load when the load is on or charging. For example, if a television is on, the television is considered to be in use independent of whether the room is occupied or not. Perhaps the user is listening to a particular program on the television from another room. When the television is turned off (e.g., changed to standby mode), the controllable electrical outlet 110 may disconnect the television from the AC power source when the room becomes unoccupied, for example, to save energy.

Some plug-in electrical loads may be critical loads that should be continuously powered (e.g., computers, medical devices, etc.). The controllable electrical outlet 110 may be configured to determine if a critical load is plugged into the controllable electrical outlet 110 and/or the standard electrical outlets 120 and to prevent the critical load from being turned off, e.g., by disabling control of the critical load by the input devices (e.g., the remote control device 130, the occupancy sensor 140, and/or the controller 150). For example, the controllable electrical outlet 110 may be configured to determine that the computer 104 is plugged into one of the controllable electrical outlet 110 and/or the standard electrical outlets 120 by monitoring an electrical signature of the load current drawn by the computer. The controllable electrical outlet 110 may be configured to record and store the electrical signature of the load current conducted by the computer 104 when the computer 104 is plugged into the controllable electrical outlet 110 and/or the standard electrical outlets 120, e.g., when the load control system 100 is first configured after installation. The controllable electrical outlet 110 may also have one or more predetermined electrical signatures of critical loads stored in memory prior to installation. During normal operation, the controllable electrical outlet 110 may be configured to compare an electrical signature drawn by an electrical load to one or more of the plurality of electrical signatures stored in memory. If the controllable electrical outlet 110 determines that an electrical load plugged into the controllable electrical outlet 110 and/or a standard electrical outlet 120 is a critical load via its electrical signature (e.g., that the electrical load is the computer 104), the controllable electrical outlet 110 may be configured to continuously power the electrical load at all times, e.g., by not disconnecting power from the electrical load in response to the remote control device 130, the occupancy sensor 140, and/or the controller 150.

The controllable electrical outlet 110 may be configured to determine that the room in which an electrical load (e.g., the computer 104 and/or the monitor 106) is located is occupied in response to the magnitudes of the load currents conducted by the switched and/or unswitched electrical loads. For example, if the magnitude of the load current conducted by the computer 104 has increased and/or is actively changing, the controllable electrical outlet 110 may be configured to determine that the room in occupied. If the controllable electrical outlet 110 determines that one or more of the electrical loads plugged into the controllable electrical outlet 110 and/or the standard electrical outlets 120 are off, are in the standby mode, and/or are not charging a rechargeable load, the controllable electrical outlet 110 may determine that the room is vacant. The controllable electrical outlet 110 may be configured to turn on and off the electrical loads plugged into the controllable electrical outlet 110 and/or the standard electrical outlets 120 in response to the occupancy and/or vacancy conditions determined from the magnitudes of the load currents.

As described above, the remote control device 130, the occupancy sensor 140, and/or the system controller 150 may operate as a control-source device (e.g., an RF transmitter) and the controllable electrical outlet 110 may operate as a control-target device (e.g., an RF receiver). Alternatively or additionally, the control devices of the load control system 100 may comprise an RF transceiver, such that the devices are able to transmit and receive the RF signals 108. For example, the controllable electrical outlet 110 may be configured to transmit feedback information, such as the status and energy consumption of the controlled loads, back to the system controller 150, which may be configured to report the information to external devices via the network 152. Examples of RF load control systems are described in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, and U.S. Pat. No. 9,553,451, issued Jan. 24, 2017, entitled LOAD CONTROL SYSTEM HAVING INDEPENDENTLY-CONTROLLED UNITS RESPONSIVE TO A BROADCAST CONTROLLER, the entire disclosures of which are both hereby incorporated by reference.

In addition, the controllable electrical outlet 110 may operate a signal repeater of the load control system 100. For example, the controllable electrical outlet 110 may be configured to receive a digital message from one of the control devices of the load control system 100 (e.g., the remote control device 130, the occupancy sensor 140, the system controller 150, or another controllable electrical outlet) and to retransmit the digital message to other control devices of the load control system (e.g., the system controller 150 or another controllable electrical outlet). Examples of RF load control systems having signal repeaters are described in greater detail in commonly-assigned U.S. Pat. No. 5,848,054, issued Dec. 8, 1998, entitled REPEATER FOR TRANSMISSION SYSTEM FOR CONTROLLING AND DETERMINING THE STATUS OF ELECTRICAL DEVICES FROM REMOTE LOCATIONS, and U.S. Pat. No. 6,803,728, issued Oct. 12, 2004, entitled SYSTEM FOR CONTROL OF DEVICES, the entire disclosures of which are hereby incorporated by reference.

Since the controllable electrical outlet 110 may be adapted to be installed in the standard electrical wallbox and may be responsive to the RF signals 108 (e.g., that are transmitted directly to the controllable electrical outlet 110), the load control system 100 may not require any additional control devices (e.g., load control devices installed above the ceiling of the room, behind the walls of the room, or in an electrical closet) in order to provide control of the electrical loads plugged into the controllable electrical outlet 110 and the standard electrical outlets 120 in response to the RF signals 108. This reduces the overall cost of the load control system 100 and simplifies the installation of the load control system 100 since no additional control devices need to be installed.

The controllable electrical outlet 110 could be responsive to other types of input devices, such as, for example, daylight sensors, radiometers, cloudy-day sensors, shadow sensors, window sensors, temperature sensors, humidity sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices (such as fire protection, water protection, and medical emergency devices), power monitoring devices (such as power meters, energy meters, utility sub-meters, utility rate meters), residential, commercial, or industrial controllers, interface devices with other control systems (such as security systems and emergency alert systems), and/or any combination of these input devices. One or more of the different types of input devices may be provided in a single load control system 100.

The load control system 100 may also comprise one or more other types of plug-in electrical load and/or switched electrical loads, such as, for example, lighting loads (e.g., incandescent lamps, halogen lamps, electronic low-voltage lighting loads, and magnetic low-voltage lighting loads); dimming ballasts for driving gas-discharge lamps; light-emitting diode (LED) drivers for driving LED light sources; table or floor lamps; screw-in luminaires including dimmer circuits and incandescent or halogen lamps; screw-in luminaires including ballasts and compact fluorescent lamps; screw-in luminaires including LED drivers and LED light sources; motor loads, such as ceiling fans and exhaust fans; motorized window treatments; projection screens; motorized interior or exterior shutters; heating and/or cooling systems; heating, ventilation, and air-conditioning (HVAC) systems; air conditioners; compressors; electric baseboard heater controllers; controllable dampers; variable air volume controllers; fresh air intake controllers; ventilation controllers; hydraulic valves for use in radiators and radiant heating system; humidity control units; humidifiers; dehumidifiers; water heaters; boiler controllers; pool pumps; refrigerators; freezers; appliances; televisions; computer monitors; printers; copiers; fax machines; video cameras; audio systems; amplifiers; speakers; overhead projectors; visual presenters; smart boards; coffee makers; toasters; elevators; power supplies; generators; electric chargers; electric vehicle chargers; medical devices (e.g., heart/lung machines), or alternative energy controllers.

Figure 2:
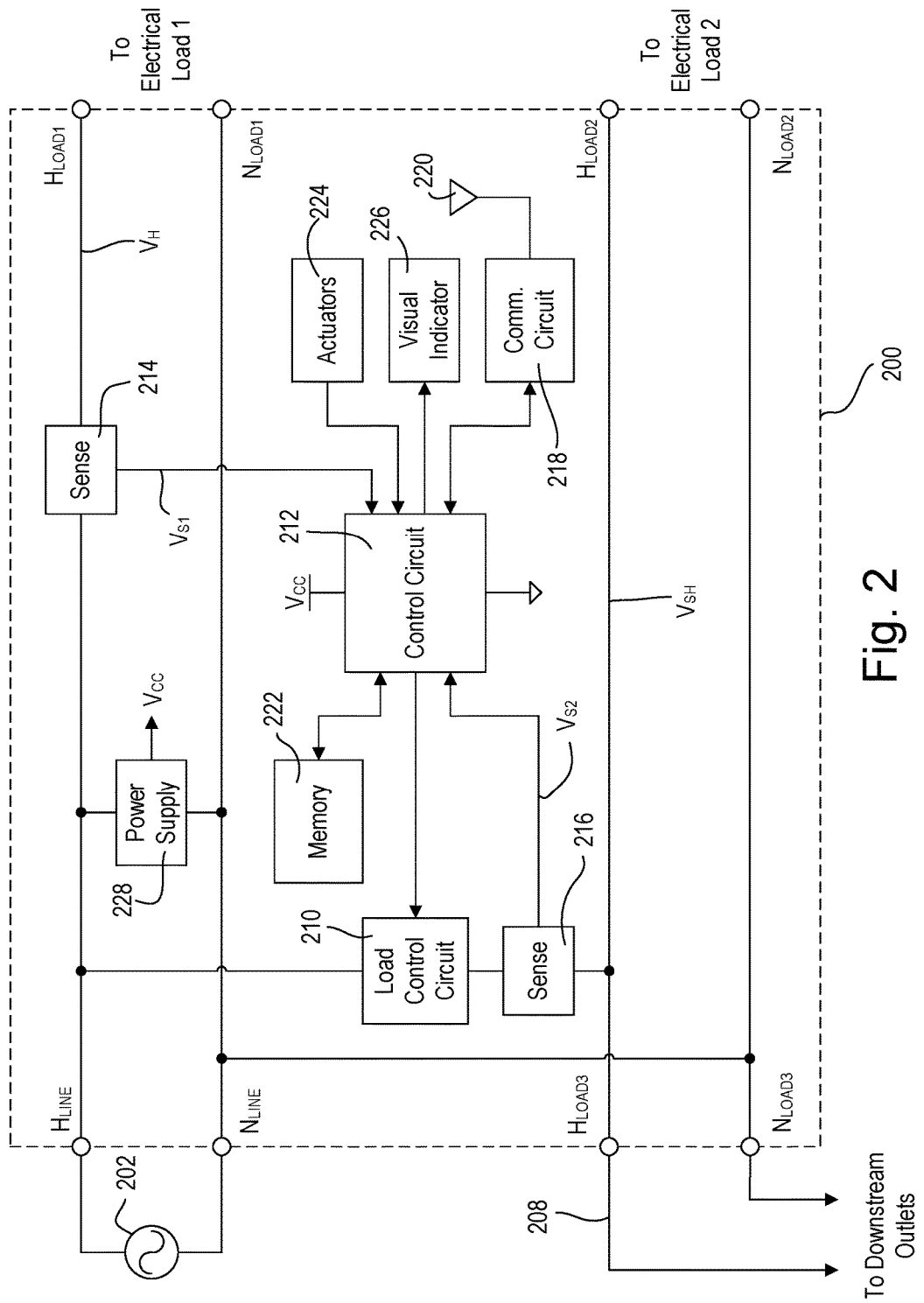
FIG. 2 is a simplified block diagram of an example controllable electrical outlet.

FIG. 2 is a simplified block diagram of an example controllable electrical outlet 200 that may be deployed as, for example, the controllable electrical outlet 110 of the load control system 100 shown in FIG. 1. The controllable electrical outlet 200 may be adapted to be mounted in a standard electrical wallbox. As shown, the controllable electrical outlet 200 may include a line-side hot electrical connection $H_{LINE}$ (e.g., the line voltage input 115) and a line-side neutral electrical connection $N_{LINE}$. The line-side hot electrical connection $H_{LINE}$ and the line-side neutral electrical connection $N_{LINE}$ may be coupled to an AC power source 202 (e.g., the AC power source 102) for receiving a power source voltage (e.g., the hot voltage $V_H$) from the AC power source 202. The controllable electrical outlet 200 may further comprise a first load-side hot electrical connection $H_{LOAD1}$ and a first load-side neutral electrical connection $N_{OUT1}$, which may be provided at an electrical receptacle (e.g., the upper unswitched receptacle 112 of the controllable electrical outlet 110) for powering a first electrical load (e.g., a first plug-in electrical load). The hot voltage $V_H$ received at the line-side hot electrical connection $H_{LINE}$ may be fed through the controllable electrical outlet 200 to the first load-side hot electrical connection $H_{LOAD1}$.

The controllable electrical outlet 200 may further comprise a second load-side hot electrical connection $H_{LOAD2}$ and a second load-side neutral electrical connection $N_{LOAD2}$, which may also be provided at an electrical receptacle (e.g., the lower switched receptacle 114 of the controllable electrical outlet 110) for powering a second electrical load (e.g., a second plug-in electrical load). The controllable electrical outlet 200 may comprise a load control circuit 210 (e.g., a controllable switching circuit, such as a relay) coupled in series electrical connection between the line-side hot electrical connection $H_{LINE}$ and the second load-side hot electrical connection $H_{LOAD2}$. The load control circuit 210 may comprise a relay having a single-pole single-throw (SPST) mechanical switch coupled in series electrical connection between the line-side hot electrical connection $H_{LINE}$ and the second load-side hot electrical connection $H_{LOAD2}$ and at least one operating coil for opening and closing the SPST switch. The load control circuit 210 may be rendered conductive and non-conductive in response to a control circuit 212 (e.g., a digital control circuit) to provide a switched-hot voltage (e.g., the switched-hot voltage $V_{SH}$) at the second load-side hot electrical connection $H_{LOAD2}$ for turning the second electrical load on and off. For example, the control circuit 212 may be coupled to the at least one operating coil of the relay for opening and closing the SPST switch of the relay. The control circuit 212 may include one or more of a processor (e.g., a microprocessor), a microcontroller, a programmable logic device (PLD), a field programmable gate array (FPGA), an application specific integrated circuit (ASIC), or any suitable processing device.

The controllable electrical outlet 200 may further comprises a third load-side hot electrical connection $H_{LOAD3}$ and a third load-side neutral electrical connection $N_{LOAD3}$. For example, the third load-side hot electrical connection $H_{LOAD3}$ may be provided at a wired electrical connection, such as a screw terminal (e.g., the controlled wired output 116 of the controllable electrical outlet 110) for powering one or more downstream standard electrical outlets (e.g., the standard electrical outlets 120). The third load-side neutral electrical connection $N_{LOAD3}$ may also be provided at a screw terminal. However, the third load-side neutral electrical connection $N_{LOAD3}$ may be an optional connection since the third load-side neutral electrical connection $N_{LOAD3}$ is coupled to the line-side neutral electrical connection $N_{LINE}$ (e.g., which is coupled to the neutral side of the AC power source 202). The switched-hot voltage $V_{SH}$ may be provided at the third load-side switched-hot electrical connection $H_{LOAD3}$. The downstream electrical outlets may receive the switched-hot voltage $V_{SH}$ via an electrical wire 208 (e.g., the electrical wire 128 of FIG. 1). The control circuit 212 may be configured to control the load control circuit 210 for connecting power to or disconnecting power from one or more of the receptacles of each of the downstream electrical outlets. The downstream electrical outlets may receive the hot voltage $V_H$ via an electrical wire (e.g., the electrical wire 126 of FIG. 1) that is wired to the line-side hot electrical connection $H_{LINE}$ in the electrical wallbox of the controllable electrical outlet 200.

Alternatively or additionally, the load control circuit 210 may comprise a dimmer circuit or driver circuit for controlling the amount of power delivered to the electrical loads connected to the second load-side hot electrical connection $H_{LOAD2}$, the third load-side hot electrical connection $H_{LOAD3}$, and/or the downstream electrical outlets. For example, the load control circuit 210 may comprise a bidirectional semiconductor switch (e.g., a triac), which may be controlled by the control circuit 212 using a standard phase-control dimming technique.

The controllable electrical outlet 200 may comprise one or more sense circuits for detecting and/or measuring the power being consumed by the electrical loads plugged into the controllable electrical outlet 200 and/or the downstream electrical outlets. For example, the controllable electrical outlet 200 may comprise a first sense circuit 214 coupled in series between the line-side hot electrical connection $H_{LINE}$ and the first load-side hot electrical connection $H_{LOAD1}$ for measuring a load current conducted by the first electrical load, and a second sense circuit 216 coupled in series with the load control circuit 210 for measuring a load current conducted by the second electrical loads and one or more electrical loads plugged into the downstream electrical outlets. The sense circuits 214, 216 may generate respective first and second sense signals $V_{S1}$, $V_{S2}$ that are received by the control circuit 212 and are representative of the magnitudes of the respective load currents.

While the downstream electrical outlets may receive the hot voltage $V_H$ via an electrical wire that is wired to the line-side hot electrical connection $H_{LINE}$ as described above, the downstream electrical outlets could (e.g., alternatively) receive power through the controllable electrical outlet 200. For example, the controllable electrical outlet 200 could comprise one or more additional electrical connections to which the unswitched receptacles of the downstream electrical outlets could be connected. The first sense circuit 214 could be coupled to the additional electrical connections, for example, such that a total load current of the first electrical load and the unswitched receptacles of the downstream electrical outlets may be conducted through the first sense circuit 214. Accordingly, the magnitude of the first sense signal $V_{S1}$ generated by the first sense circuit 214 may be representative of the total load current of the unswitched electrical loads coupled to the controllable electrical outlet 200, and the magnitude of the second sense signal $V_{S2}$ generated by the sense circuit 216 may be representative of the total load current of the switched electrical loads controlled by the controllable electrical outlet 200.

The controllable electrical outlet 200 may comprise a communication circuit 218, for example, a wireless communication circuit (e.g., an RF transceiver) coupled to an antenna 220 for transmitting and receiving digital messages (e.g., via wireless signals, such as the RF signals 108 of FIG. 1) at a specified frequency (e.g., a transmission frequency, such as 434 MHz or 2.4 GHz). The communication circuit 218 may be configured to receive the digital messages via the RF signals 108 according to a predefined RF communication protocol, such as, for example, one or more of LUTRON CLEAR CONNECT, WIFI, BLUETOOTH, ZIGBEE, Z-WAVE, KNX-RF, LTE, or ENOCEAN RADIO protocols. Alternatively, the communication circuit 218 may comprise an RF transmitter for transmitting RF signals and/or an RF receiver for receiving RF signals. The antenna 220 may comprise a resonant loop antenna as will be described in greater detail below.

The controllable electrical outlet 200 may comprise a memory 222 communicatively coupled to the control circuit 212. The control circuit 212 may be configured to use the memory 222 for the storage and/or retrieval of, for example, the serial numbers of the input devices (e.g., the wireless transmitters) to which the controllable electrical outlet 200 is responsive (e.g., to which the controllable electrical outlet is associated). The memory 222 may be implemented as an external integrated circuit (IC) or as an internal circuit of the control circuit 212.

The controllable electrical outlet 200 may comprise one or more actuators 224 (e.g., buttons) for providing manual user inputs to the control circuit 212. For example, the control circuit 212 may be configured to control the load control circuit 210 to render the relay conductive and non-conductive in response to actuations of the actuators 224. In addition, the control circuit 212 may be configured to associate the controllable electrical outlet 200 with one or more of the input devices (e.g., the remote control device 130, the occupancy sensor 140, and the controller 150) in response to actuations of one or more of the actuators 224 (e.g., the programming button 118 of the controllable electrical outlet 110). The controllable electrical outlet 200 may also comprise a visual indicator circuit 226 that may comprise one or more LEDs for illuminating at least one visual indicator (e.g., the visual indicator 119) for providing feedback to a user during configuration and/or normal operation.

The controllable electrical outlet 200 may include a power supply 228 coupled between the line-side hot electrical connection $H_{LINE}$ and the line-side neutral electrical connection $N_{LINE}$ for generating a DC supply voltage $V_{CC}$ for powering one or more of the control circuit 212, the communication circuit 218, the memory 222, and other low-voltage circuitry of the controllable electrical outlet 200. For example, the power supply 228 may comprise a non-isolated power supply (e.g., a Class 1 power supply) or an isolated power supply (e.g., a Class 2 power supply).

The control circuit 212 may be configured to control the load control circuit 210 to render the relay conductive and non-conductive in response to digital messages received via RF signals from input devices (e.g., the remote control device 130, the occupancy sensor 140, and the system controller 150 shown in FIG. 1). For example, the control circuit 212 may receive digital messages including commands for providing manual control of the switched electrical loads (e.g., from the remote control device 130) and/or for providing automated control of the switched electrical loads (e.g., from the occupancy sensor 140 and/or the system controller 150). A system controller (e.g., the system controller 150) may be configured to transmit digital messages to the controllable electrical outlet 200 to control the switched electrical loads in accordance with one or more timeclock events of a timeclock schedule, for example, to turn on the switched electrical loads during the day and to turn off the switched electrical loads at night. In addition, the control circuit 212 may be configured to cause the communication circuit 218 to transmit, for example, one or more digital messages including information regarding the power consumed by the unswitched and/or switched electrical loads to the system controller.

After controlling the load control circuit 210 in response to digital messages received via the communication circuit 218, the control circuit 212 may be configured to store in the memory 222 information regarding the type of input device from which the communication circuit 218 received the digital message, and/or how the control circuit 212 controlled the load control circuit 210 in response to that digital message. The control circuit 212 may transmit this information to the system controller for analysis regarding how much energy is saved in response to certain types of input devices. For example, the system controller 150 may be configured to determine how much energy is saved as a result of the controllable electrical outlet 200 turning off the controlled electrical loads in response to the occupancy sensor 140 versus how much energy is saved as a result of the controllable electrical outlet turning off the controlled electrical loads in response to the remote control device 130.

The control circuit 210 may be configured to measure the amount of power consumed by the unswitched electrical loads (e.g., in response to the first sense signal $V_{S1}$ generated by the first sense circuit 214) and/or to determine the amount of power consumed by the switched electrical loads (e.g., in response to the second sense signal $V_{S2}$ generated by the sense circuit 216). The control circuit 210 may be configured to determine a balance between the amount of power consumed by the unswitched and switched electrical loads and report this information to the system controller. The controllable electrical outlet 200 and/or the system controller may be configured to transmit a digital message including an alert that the amount of power consumed by the unswitched and switched electrical loads is unbalanced (e.g., in an email or text message).

Figure 4:
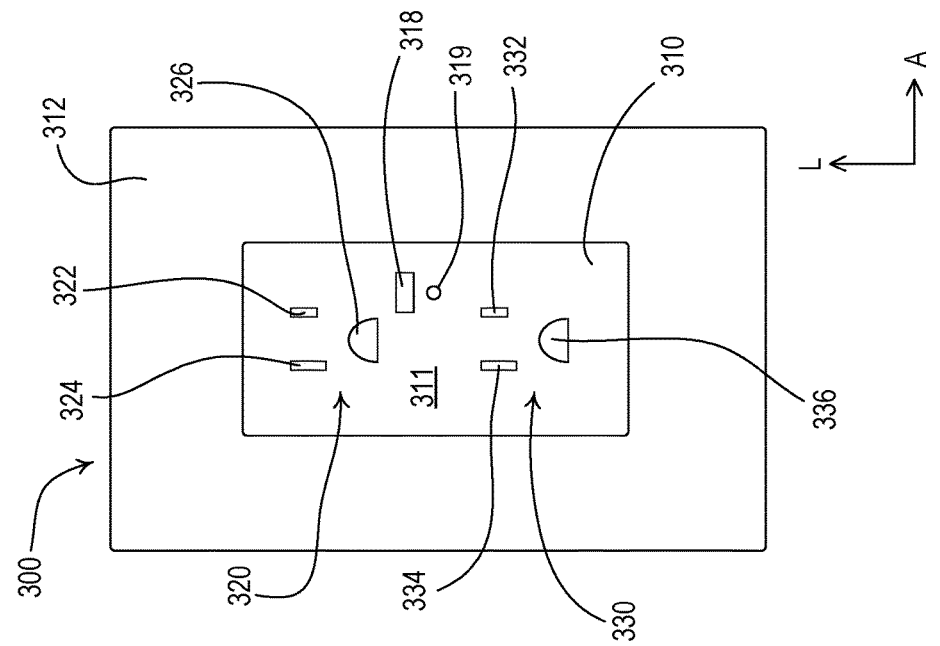
FIG. 4 is a front view of another example controllable electrical outlet.
Figure 3:
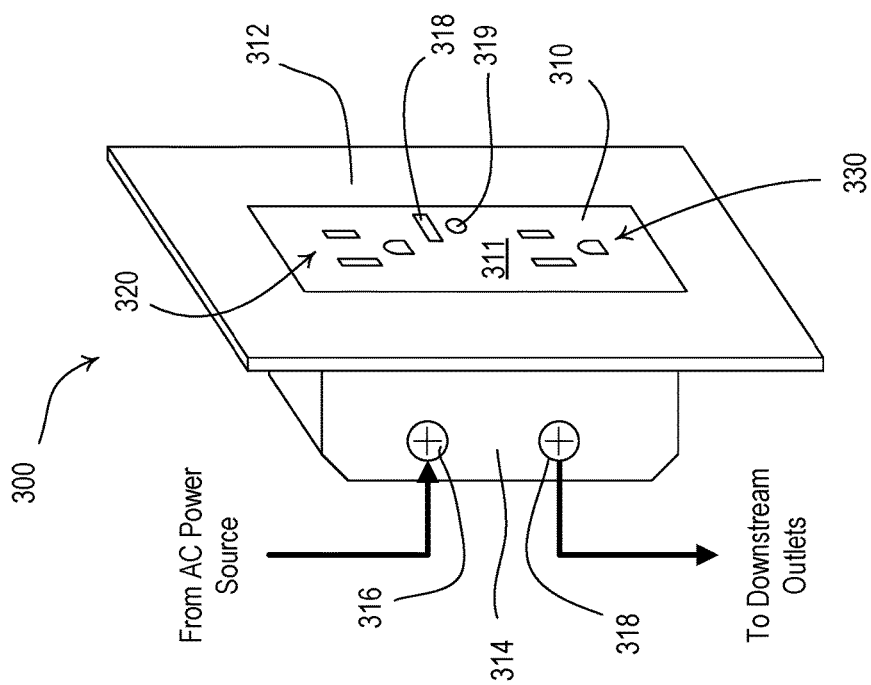
FIG. 3 is a perspective view of an example controllable electrical outlet.

FIG. 3 is a perspective view and FIG. 4 is a front view of an example controllable electrical outlet 300, which may be an example of the controllable electrical outlet 110 of FIG. 1 and/or the controllable electrical outlet 200 of FIG. 2. The controllable electrical outlet 300 may be mounted to a standard electrical wallbox. The controllable electrical outlet 300 may comprise a bezel portion 310 having a front surface 311 adapted to be received through an opening of a faceplate 312. The controllable electrical outlet 300 may include circuitry that is similar to the circuitry of the controllable electrical outlet 200. The circuitry may be housed in a rear enclosure portion 314 of the controllable electrical outlet 300, for example, such that a wireless communication circuit (e.g., the wireless communication circuit 218) may be located inside of the wallbox. An actuator, such as a programming button 318 (e.g., one of the actuators 224) may be provided on the bezel portion 310. The programming button 318 may be actuated to associate the controllable electrical outlet 300 with one or more input devices (e.g., wireless transmitters). The controllable electrical outlet 300 may also comprise a visual indicator 319 that may be illuminated to provide feedback to a user during configuration and/or normal operation. For example, the visual indicator 319 may be illuminated by a light source (e.g., an LED of the visual indicator circuit 226) located inside of the controllable electrical outlet 300.

The front surface 311 of the bezel 310 may be located in a plane extending in a longitudinal direction L and a lateral direction A as shown in FIG. 4. The bezel portion 310 may comprise an upper receptacle 320 and a lower receptacle 322 for receiving the plugs of plug-in electrical loads. The upper receptacle 320 and the lower receptacle 322 may be spaced apart from each other in the longitudinal direction L. For example, the upper receptacle 320 may be an unswitched receptacle (e.g., similar to the upper receptacle 112 of the controllable electrical outlet 110 and/or the first load-side hot and neutral electrical connections $H_{LOAD1}$, $N_{LOAD1}$ of the controllable electrical outlet 200) and the lower receptacle 322 may be a switched receptacle (e.g., similar to the lower receptacle 114 of the controllable electrical outlet 110 and/or the second load-side hot and neutral electrical connections $H_{LOAD2}$, $N_{LOAD2}$ of the controllable electrical outlet 200). Each of the upper and lower receptacles 320, 330 may comprise a respective hot opening 322, 332 for receiving a hot blade of a plug, a respective neutral opening 324, 334 for receiving a neutral blade of the plug, and a respective ground opening 326, 336 for receiving a ground blade of the plug.

The rear enclosure portion 314 may comprise a hot screw terminal 318 for receiving a hot voltage from an AC power source (e.g., the line voltage input 115 of the controllable electrical outlet 110 and/or the line-side hot electrical connection $H_{LINE}$ of the controllable electrical outlet 200). The rear enclosure portion 314 may also comprise at least one neutral terminal (not shown) adapted to be coupled to the neutral side of the AC power source (e.g., the line-side neutral electrical connection $N_{LINE}$ of the controllable electrical outlet 200). The rear enclosure portion 314 may also comprise a wired-output screw terminal 319 adapted to be electrically connected to one or more downstream standard electrical outlets. The controllable electrical outlet 300 may provide a switched-hot voltage $V_{SH}$ at the wired-output screw terminal 319, such that the controllable electrical outlet 300 may be able to connect power to or disconnect power from one or more of the receptacles of one or more downstream electrical outlets. Examples of controllable receptacles are described in greater detail in commonly-assigned U.S. Patent Application Publication No. 2015/0249337, published Sep. 3, 2015, entitled CONTROLLABLE ELECTRICAL OUTLET WITH A CONTROLLED WIRED OUTPUT, the entire disclosure of which is hereby incorporated by reference.

While the controllable electrical outlet 300 shown in FIGS. 3 and 4 has U.S. style receptacles, the controllable electrical outlet 300 may alternatively or additionally have receptacles of styles used in other countries. In addition, the controllable electrical outlet 300 could comprise other types of receptacles, for example, one or more Universal Serial Bus (USB) connectors, and an internal power supply for charging an electrical device, such as the battery of a smart phone.

Figure 6:
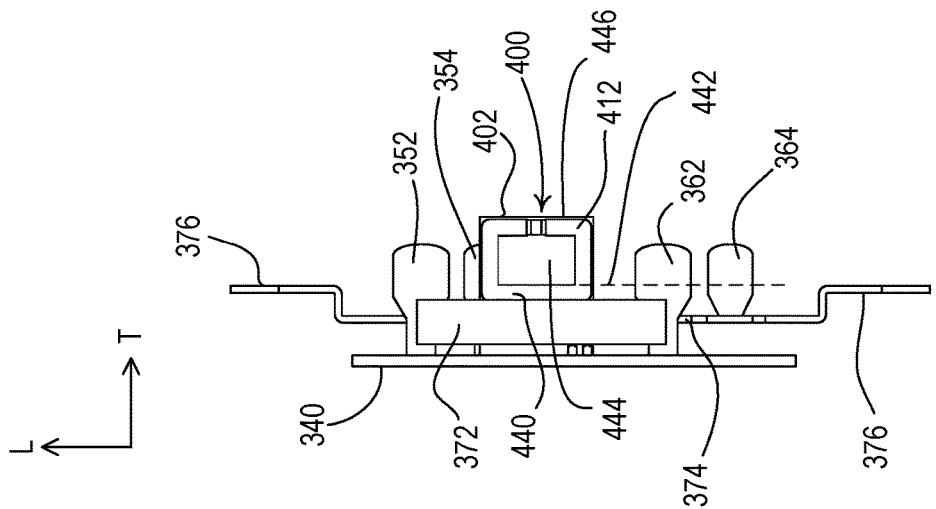
FIG. 6 is a left side view of the portion of the controllable electrical outlet shown in FIG. 5.
Figure 5:
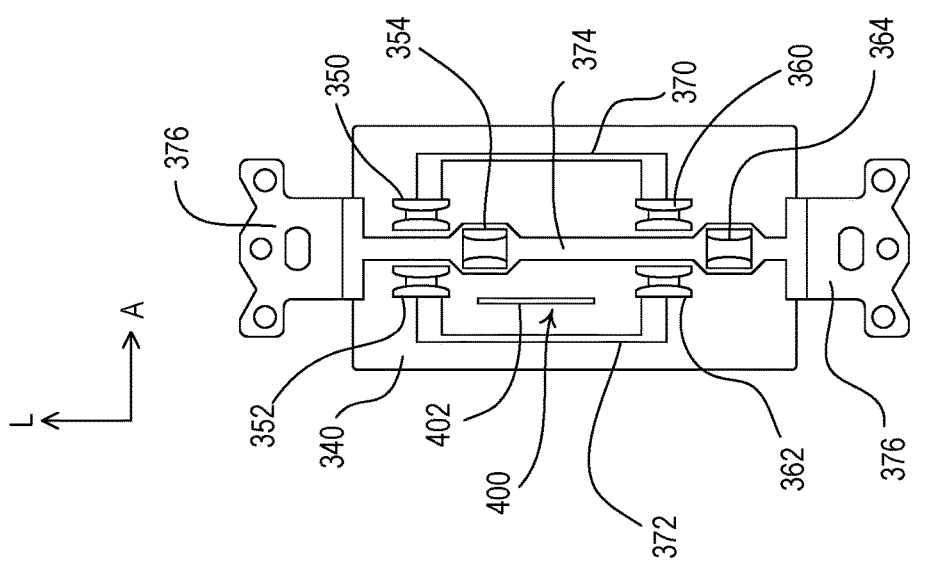
FIG. 5 is a front view of a portion of the controllable electrical outlet of FIGS. 3 and 4.

FIG. 5 is a front view and FIG. 6 is a left side view of a portion of the controllable electrical outlet 300 showing a main PCB 340, which may have mounted thereon the electrical circuitry of the controllable electrical outlet (e.g., as shown in FIG. 2). The main PCB 340 may be located in a plane extending in the longitudinal direction L and the lateral direction A as shown in FIG. 5 (e.g., parallel to the plane of the front surface 311 of the bezel portion 310). The controllable electrical outlet 300 may include a pair of upper hot contacts 350 and a pair of upper neutral contacts 352 configured to mechanically connect to (e.g., pinch) the hot and neutral blades of a plug, respectively, that are received through the upper hot and neutral openings 322, 324 in order to provide electrical connection to the hot and neutral blades. The controllable electrical outlet 300 may also include a pair of upper ground contacts 354 configured to mechanically connect to (e.g., pinch) the ground blade of the plug, which may be received through the upper ground opening 326. The controllable electrical outlet 300 may include a pair of lower hot contacts 360 and a pair of lower neutral contacts 362 configured to mechanically connect to (e.g., pinch) the hot and neutral blades of a plug, respectively, that are received through the lower hot and neutral openings 332, 334 in order to provide electrical connection to the hot and neutral blades. The controllable electrical outlet 300 may also include a pair of lower ground contacts 364 configured to mechanically connect to (e.g., pinch) the ground blade of the plug, which may be received through the lower ground opening 336.

The controllable electrical outlet 300 may include a load control circuit (not shown) for controlling the power delivered to the plug-in electrical loads plugged into the upper and lower receptacles 320, 330. The load control circuit may be mounted to the main PCB 340. For example, the upper and lower receptacles 320, 330 may be controlled in unison because the upper contacts 350, 352 are coupled to the lower contacts 360, 362 by respective electrical contact coupling members, e.g., hot and neutral coupling members 370, 372 that extend in the longitudinal direction L between the contacts. The hot and neutral coupling members 370, 372 may be cut (e.g., made non-conductive at a point along the length) to provide for separate control of the upper and lower receptacles 320, 330. The upper ground contacts 354 may be coupled to the lower ground contacts 364 by a ground coupling member 374, which may be coupled to mounting tabs 376 of the controllable electrical outlet 300. The ground coupling member 374 may extend in the longitudinal direction L between the mounting tabs 376.

If the load control circuit of the controllable electrical outlet 300 is configured to adjust the amount of power delivered to the plug-in electrical loads (e.g., the load control circuit is a dimmer circuit), the respective electrical outlet may comprise a protrusion at the controlled receptacle for preventing a standard electrical plug from being plugged into the controlled receptacle. Examples of such protrusions for preventing standard plugs from being plugged into a controlled receptacle are described in greater detail in commonly-assigned U.S. Pat. No. 7,198,523, issued Apr. 3, 2007, and U.S. Pat. No. 7,311,558, issued Dec. 25, 2007, both entitled RECEPTACLE AND PLUG THEREFOR, the entire disclosures of which are hereby incorporated by reference.

The controllable electrical outlet 300 may also comprise a resonant loop antenna 400 having an antenna PCB 402. FIGS. 7 and 8 show first and second layers 410, 412, respectively, of the antenna PCB 402, where the first and second layers may be overlaid over each other. The antenna PCB 402 may be made of a non-conductive substrate, and may be substantially rectangular or square in shape. The antenna PCB 402 may comprise first and second tabs 404, 406 at a bottom edge 408 of the antenna PCB. The first and second tabs 404, 406 may be received in openings in the main PCB 340, such that the antenna PCB 402 may be mechanically connected to the main PCB and oriented perpendicular to a plane of the main PCB.

The resonant loop antenna 400 may comprise a main loop trace 412 (e.g., a main loop) disposed on (e.g., laid out on) the first layer 410, which may be an outer layer of the antenna PCB 402. The main loop trace 412 may be located near a top side 405 of the antenna PCB 402. The main loop trace 412 may have a break 414 with a capacitor 416 provided across the break. The capacitor 416 may be a variable capacitor to allow for tuning of a resonant frequency of the main loop trace 412. The first layer 410 may also have first and second electrical pads 418, 419 on the first tab 404 to allow for electrical connection to communication circuit 218 (e.g., the RF transceiver) on the main PCB 340 (e.g., soldered to electrical pads on the main PCB). The second tab 406 may provide mechanical support for the antenna PCB 402.

The resonant loop antenna 400 may also comprise a feed loop trace 422 (e.g., a feed loop) disposed on (e.g., laid out on) the second layer 420, which may be another outer layer or an internal layer of the antenna PCB 402. The feed loop trace 422 may be coupled to electrical pads 418, 419 on the first layer 410 through vias 424. The first electrical pad 418 may be electrically coupled to the RF transceiver on the main PCB (e.g., the RF feed) and the second electrical pad 419 may be electrically coupled to an antenna ground. The main loop trace 412 on the first layer 410 may overlap the feed loop trace 422 on the second layer 420. The feed loop trace 422 does not extend to the top edge 405 of the antenna PCB 402 as shown in FIG. 8. The main loop trace 412 may be magnetically coupled to the feed loop trace 422 and may be electrically isolated from the feed loop trace. When a signal is transmitted from the RF transceiver to the first electrical pad 418, current may flow through the feed loop trace 422 on the second layer 420. This may cause current to be induced in the main loop trace 412 on the first layer 410 due to the magnetic coupling of the main loop trace 412 and the feed loop trace 422 resulting in an RF signal being transmitted from the controllable electrical outlet.

Figure 9:
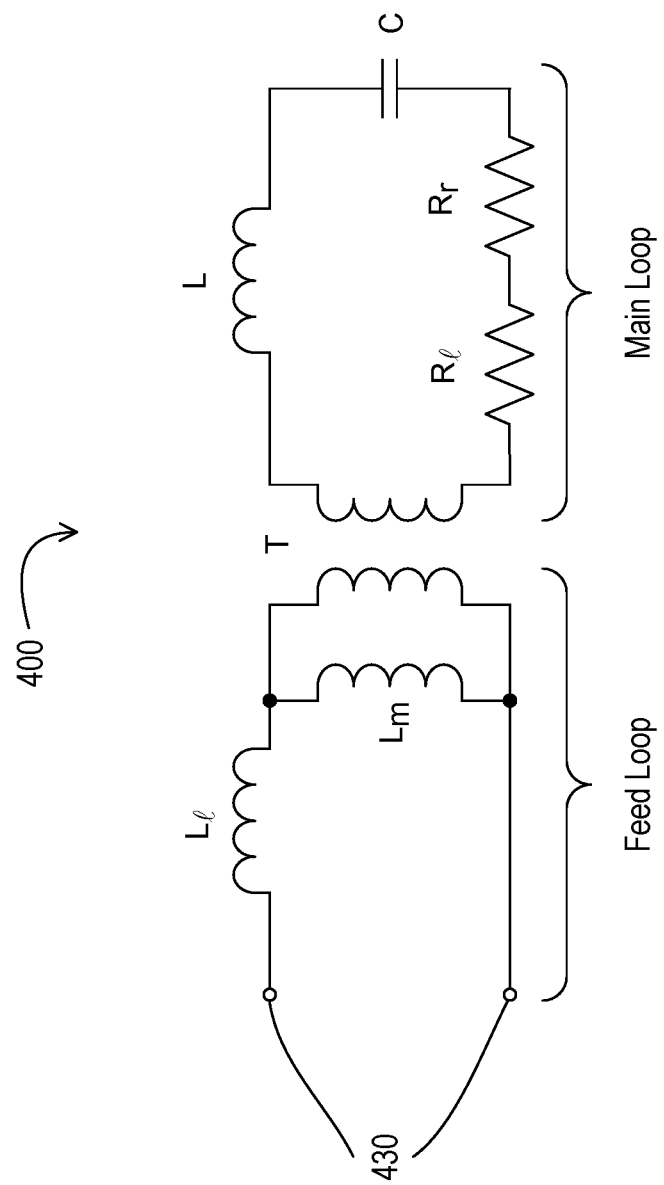
FIG. 9 shows an example equivalent circuit of a resonant loop antenna.

FIG. 9 shows an example equivalent circuit of the resonant loop antenna 400. The main loop (e.g., the main loop trace 420) may be the primary radiating element of the antenna 400 and may include an inductance L and capacitance C in series (e.g., where the capacitance C may be a variable capacitance). When energized, the main loop may resonate at a frequency determined by the values of the inductance L and the capacitor C and enables the transmitting and receiving of RF signals via a radiation resistance $R_r$, which may be a representation of the energy delivered to radiation. The losses in the main loop may be represented by a loss resistance $R_l$. The main loop may be primarily magnetically coupled to the feed loop (e.g., the feed loop trace 422). This coupling is shown schematically in FIG. 9 by an ideal transformer T. The feed loop may include a magnetizing inductance $L_m$, a leakage inductance $L_l$, and two ends 430 that connect to the RF transceiver. The feed loop may allow for the conduction of signals between the RF transceiver and the main loop.

In this way, the antenna 400 may be adapted to receive RF signals via the main loop, with those radio frequency signals being electromagnetically coupled to the feed loop for input to the RF transceiver. Conversely, the feed loop may receive a feed signal to be transmitted from the RF transceiver, and may electromagnetically couples the feed signal to the main loop for transmission of RF signals to an external wireless device (e.g., the system controller 150). Examples of load control devices having resonant loop antennas are described in greater detail in commonly-assigned U.S. Pat. No. 7,362,285, issued Apr. 22, 2008, entitled COMPACT RADIO FREQUENCY TRANSMITTING AND RECEIVING ANTENNA AND CONTROL DEVICE EMPLOYING SAME, and U.S. Pat. No. 7,592,967, issued Sep. 22, 2009, entitled COMPACT ANTENNA FOR A LOAD CONTROL DEVICE, the entire disclosures of which are hereby incorporated by reference.

Referring back to FIGS. 5 and 6, the antenna PCB 400 may be oriented perpendicular to the plane of the main PCB 340 and may extend from the main PCB 340 towards the front surface 311 in a transverse direction T. The antenna PCB 400 may be arranged substantially parallel to the ground coupling member 374, e.g., in a plane extending in the longitudinal direction L and the transverse direction T as shown in FIG. 6. As shown in FIG. 5, the antenna PCB 400 may be centrally located in the controllable electrical outlet 300 and may be located away (e.g., as far away as possible) from the contacts 350-364 and the coupling members 370-374. The antenna PCB 400 may be located away from the upper contacts 350, 352 and the lower contacts 360, 362 in the longitudinal direction L (e.g., approximately centrally located between the upper contacts and the lower contacts). As shown in FIG. 5, the antenna PCB 400 may be located away from the neutral coupling member 372 and the ground coupling member 374 in the lateral direction A (e.g., approximately centrally located between the neutral coupling member 372 and the ground coupling member 374). Alternatively, the antenna PCB 400 may be located between (e.g., approximately centrally located between) the hot coupling members 370 and the ground coupling member 374. In addition, the antenna PCB 400 may also be arranged in a plane extending in the lateral direction A and the transverse direction T, for example, if the ground coupling member 374 does not extend adjacent to the center of the main PCB 340, but extends near the edges of the main PCB. While not shown in FIGS. 5 and 6, the contacts 350-364 and the coupling members 370-374 may be supported by a cradle (e.g., a plastic, non-conductive support cradle), which may be positioned between the main PCB 340 and the contacts and coupling members. The cradle (not shown) may include an opening through which the antenna PCB 400 may extend.

As shown in FIG. 6, the main loop trace 412 may be mostly located above the hot and neutral coupling members 370, 372 in a direction extending from the main PCB 340 towards the front surface 311 of the controllable electrical outlet 300 (e.g., along the transverse direction T, i.e., to the right in FIG. 6), which may improve the RF performance of the controllable electrical outlet 300. A top edge 442 of a lower portion 440 of the main loop trace 412 may be positioned above the hot and neutral coupling members 370, 372 in the transverse direction T, such that an inner portion 444 of the main loop trace 412 may not overlap with the coupling members 370, 372 in the transverse direction T (e.g., when viewed from the side as shown in FIG. 6).

The RF performance of the controllable electrical outlet 300 may be substantially immune to devices plugged into the receptacles 320, 322 (e.g., plugs, power supplies, control devices, etc.) due to the magnetic coupling between the main loop trace 412 and the feed loop trace 422 and the orientation of the main loop trace (e.g., perpendicular to the plane of the main PCB 340). For example, degradation of the RF performance of the controllable electrical outlet 300 may be less when the controllable electrical outlet includes the resonant loop antenna 400 rather than other types of antennas, such as a monopole antenna.

Since the main loop trace 412 may be electrically isolated from the feed loop trace 422 and the AC power source to which the controllable electrical outlet 300 is coupled (e.g., the AC power source 102, 202), the top edge 405 of the antenna PCB 402 may be located close to the front surface 311 and the receptacles 320, 322 of the controllable electrical outlet. In addition, because the main loop trace 412 may be isolated from the feed loop trace 422, the controllable electrical outlet 300 does not need to include an isolated power supply for powering the communication circuit 218, but can include a non-isolated power supply, which may be lower cost and smaller than an isolated power supply.

What is claimed is:

1. A controllable electrical outlet for use in a load control system adapted to receive power from a power source, the controllable electrical outlet comprising:
   two electrical receptacles, each configured to receive a plug of at least one plug-in electrical load;
   an electrical connection configured to be electrically coupled to the power source to receive a hot voltage;
   a main printed circuit board;
   a load control circuit mounted to the main printed circuit board and electrically coupled in series between the electrical connection and at least one of the electrical receptacles to control power delivered to the plug-in electrical load;
   a radio-frequency (RF) communication circuit configured to receive an RF signal at a specified frequency;
   an antenna printed circuit board comprising first and second layers, the antenna printed circuit board arranged perpendicular to the main printed circuit board, the first layer having a main loop trace characterized by an inductance and a capacitance that are resonant at the specified frequency, the second layer having a feed loop trace electrically coupled to the RF communication circuit and magnetically coupled to the main loop trace; and
   a control circuit coupled to the load control circuit and the communication circuit to control power delivered to at least one of the electrical receptacles in response to the RF signal received via the RF communication circuit.

2. The controllable electrical outlet of claim 1, further comprising:
   a bezel portion having a front surface located in a plane extending in a longitudinal direction and a lateral direction, the two electrical receptacles provided in the front surface of the bezel portion and spaced apart from each other in the longitudinal direction;
   wherein the main printed circuit board is located in a plane parallel to the plane of the front surface of the bezel portion, and the antenna printed circuit board extends from the main printed circuit board in a transverse direction perpendicular to the plane of the main printed circuit board.

3. The controllable electrical outlet of claim 2, wherein an electrical contact of one of the receptacles is coupled to an electrical contact of the other receptacle by an electrical contact coupling member that extends in the longitudinal direction.

4. The controllable electrical outlet of claim 3, wherein the antenna printed circuit board is located in a plane extending in the longitudinal direction and the transverse direction.

5. The controllable electrical outlet of claim 4, wherein a ground contact of one of the receptacles is coupled to a ground contact of the other receptacle by a ground coupling member that extends in the longitudinal direction.

6. The controllable electrical outlet of claim 5, wherein the antenna printed circuit board is located between the electrical contact coupling member and the ground coupling member and is spaced apart from the coupling members in the lateral direction.

7. The controllable electrical outlet of claim 4, wherein the antenna printed circuit board is spaced apart from the electrical contact coupling member in the lateral direction.

8. The controllable electrical outlet of claim 4, wherein the antenna printed circuit board is spaced apart from the electrical contacts of the receptacles in the longitudinal direction.

9. The controllable electrical outlet of claim 3, wherein the main loop trace of the antenna printed circuit board is mostly located above the electrical contact coupling member in the transverse direction extending from the main printed circuit board towards the front surface of the bezel.

10. The controllable electrical outlet of claim 3, wherein a top edge of a lower portion of the main loop trace of the antenna printed circuit board is positioned above the electrical contact coupling member in the transverse direction extending from the main printed circuit board towards the front surface of the bezel.

11. The controllable electrical outlet of claim 3, wherein an inner portion of the main loop trace of the antenna printed circuit board does not overlap with the electrical contact coupling member in the transverse direction extending from the main printed circuit board towards the front surface of the bezel.

12. The controllable electrical outlet of claim 1, wherein the main loop trace is electrically isolated from the feed loop trace.

13. The controllable electrical outlet of claim 12, wherein the main loop trace is located near a top edge of the antenna printed circuit board and the feed loop trace does not extend to the top edge of the antenna printed circuit board.

14. A controllable electrical outlet for use in a load control system adapted to receive power from a power source, the controllable electrical outlet comprising:
- at least one electrical receptacle configured to receive a plug of a plug-in electrical load;
- an electrical connection configured to be electrically coupled to the power source to receive a hot voltage;
- a load control circuit electrically coupled in series between the electrical connection and the electrical receptacle to control power delivered to the plug-in electrical load;
- a radio-frequency (RF) communication circuit configured to receive an RF signal;
- a resonant loop antenna comprising a feed loop electrically coupled to the RF communication circuit and a main loop magnetically coupled to the feed loop; and
- a control circuit coupled to the load control circuit and the communication circuit to control power delivered to the plug-in electrical load in response to the RF signal received via the RF communication circuit.

15. The controllable electrical outlet of claim 14, wherein the resonant loop antenna comprises an antenna printed circuit board, the main loop comprising a main loop trace disposed on a first layer of the antenna printed circuit board and characterized by an inductance and a capacitance that are resonant at a specified frequency, the feed loop comprising a feed loop trace disposed on a second layer of the antenna printed circuit board and electrically coupled to the RF communication circuit.

16. The controllable electrical outlet of claim 15, further comprising:
- a main printed circuit board on which the load control circuit is mounted;
- wherein the antenna printed circuit board is arranged perpendicular to the main printed circuit board.

17. The controllable electrical outlet of claim 14, wherein the main loop is electrically isolated from the feed loop.

18. A controllable electrical outlet for use in a load control system adapted to receive power from a power source, the controllable electrical outlet comprising:
- a bezel portion having a front surface located in a plane extending in a longitudinal direction and a lateral direction;
- two electrical receptacles provided in the front surface of the bezel portion and spaced apart from each other in the longitudinal direction, each electrical receptacle configured to receive a plug of at least one plug-in electrical load;
- an electrical connection configured to be electrically coupled to the power source to receive a hot voltage;
- a main printed circuit board located in a plane parallel to the plane of the front surface of the bezel portion;
- a load control circuit mounted to the main printed circuit board and electrically coupled in series between the electrical connection and at least one of the electrical receptacles to control power delivered to the plug-in electrical load; and
- a control circuit coupled to the load control circuit to control power delivered to at least one of the electrical receptacles;
- wherein the improvement comprises:
- a radio-frequency (RF) communication circuit configured to receive an RF signal at a specified frequency, the communication circuit coupled to the control circuit for enabling the control circuit to control the power delivered to at least one of the electrical receptacles in response to the RF signal; and
- an antenna printed circuit board comprising first and second layers, the antenna printed circuit board arranged perpendicular to the main printed circuit board, the first layer having a main loop trace characterized by an inductance and a capacitance that are resonant at the specified frequency, the second layer having a feed loop trace electrically coupled to the RF communication circuit and magnetically coupled to the main loop trace, wherein the main loop trace is electrically isolated from the feed loop trace.

19. The controllable electrical outlet of claim 18, wherein the main printed circuit board is located in a plane parallel to the plane of the front surface of the bezel, and the antenna printed circuit board is located in a plane extending in the longitudinal direction and a transverse direction perpendicular to the plane of the main printed circuit board.

20. The controllable electrical outlet of claim 19, wherein an electrical contact of one of the receptacles is coupled to an electrical contact of the other receptacle by an electrical contact coupling member that extends in the longitudinal direction, and a ground contact of one of the receptacles is coupled to a ground contact of the other receptacle by a ground coupling member that extends in the longitudinal direction; and
- wherein the antenna printed circuit board is located between the electrical contact coupling member and the ground coupling member, the antenna printed circuit board spaced apart from the coupling members in the lateral direction and spaced apart from the electrical contacts of the receptacles in the longitudinal direction.

* * * * *